United States Patent [19]

Seem et al.

[11] Patent Number: 5,568,377
[45] Date of Patent: Oct. 22, 1996

[54] FAST AUTOMATIC TUNING OF A FEEDBACK CONTROLLER

[75] Inventors: John E. Seem, Shorewood; Gaylon M. Decious, Milwaukee, both of Wis.

[73] Assignee: Johnson Service Company, Milwaukee, Wis.

[21] Appl. No.: 346,570

[22] Filed: Nov. 29, 1994

Related U.S. Application Data

[63] Continuation-in-part of Ser. No. 291,283, Aug. 16, 1994, which is a continuation-in-part of Ser. No. 908,583, Oct. 29, 1992, Pat. No. 5,355,305.

[51] Int. Cl.$^6$ .................................................. G05B 13/02
[52] U.S. Cl. ........................ 364/157; 364/162; 364/148; 364/177
[58] Field of Search ................................. 364/148, 153, 364/154, 160, 161, 162, 163, 177

[56] References Cited

U.S. PATENT DOCUMENTS

| | | | |
|---|---|---|---|
| Re. 33,267 | 7/1990 | Kraus | 364/158 |
| 4,006,346 | 2/1977 | Pemberton | 364/177 |
| 4,253,153 | 2/1981 | Bitterli et al. | 364/161 |
| 4,604,681 | 8/1986 | Sakashita | 364/177 |
| 5,166,873 | 11/1992 | Takatsu et al. | 364/161 |

OTHER PUBLICATIONS

R. W. Haines, "HVAC Systems Design Handbook", TAB Professional and Reference Books, Blue Ridge Summit, PA (1988).

D. E. Seborg, T. F. Edgar, & D. A. Mellichamp, "Process Dynamics and Control", John Wiley & Sons, NY (1989).

A. B. Corripio, "Tuning of Industrial Control Systems", Instrument Society of America, Research Triangle Park, NC (1990).

K. J. Astrom, T. Hagglund, "Automatic Tuning of PID Controllers", Instrument Society of America, Research Triangle Park, NC (1988).

C. J. Harris & S. A. Billings, "Self-Tuning and Adaptive Control: Theory and Applications", Peter Peregrinus LTD (1981).

K. J. Astrom and B. Wittenmark, "Adaptive Control", Addison-Wesley Publishing Company (1989).

T. W. Kraus & T. J. Myron, "Self-Tuning PID Controller Uses Pattern Recognition Approach", Control Eng., pp. 106–111, Jun. 1984.

E. H. Briston & T. W. Kraus, "Life with Pattern Adaptation", Proc. 1984 Am. Control Conf., pp. 888–892, San Diego, CA (1984).

C. Rohrer & Clay Nesler, "Self-Tuning Using a Pattern Recognition Approach", Johnson Controls, Inc., Res. Br. 228 (Jun. 13, 1986).

Francis Schied, "Shaum's Outline Series—Theory & Problems of Numerical Analysis", McGraw-Hill Book Co., NY (1968).

S. M. Pandit & S. M. Wu, "Timer Series & System Analysis with Applications", John Wiley & Sons, Inc., NY (1983).

*Primary Examiner*—Roy N. Envall, Jr.
*Assistant Examiner*—Karen D. Presley
*Attorney, Agent, or Firm*—Harness, Dickey & Pierce, P.L.C.

[57] ABSTRACT

A feedback controller configured to automatically tune a control system by determining proportional gain, integral time and/or derivative time control parameters based on estimates of process time delay, process time constant and process gain values which are monitored by the feedback controller. The feedback controller further determines control limits for estimating the process time delay based on the resolution of the sampled values of the process output and the standard deviation of the process output during the initial steady-state condition. The feedback controller also estimates characteristic areas for a first-order response based on a first-order plus time-delay model to determine process time constant and process gain values. These process time constant, process gain and process delay estimates are translated into proportional gain, integral time and/or derivative time control parameters based on design relations of the particular feedback controller.

36 Claims, 10 Drawing Sheets

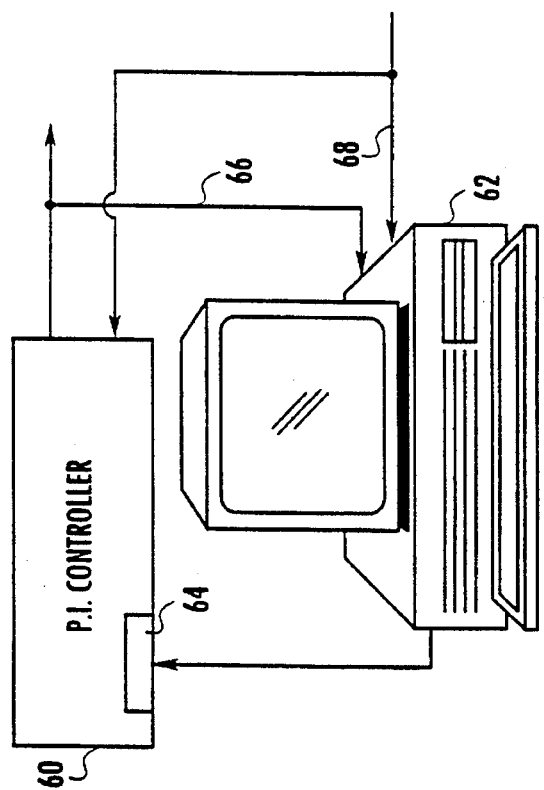
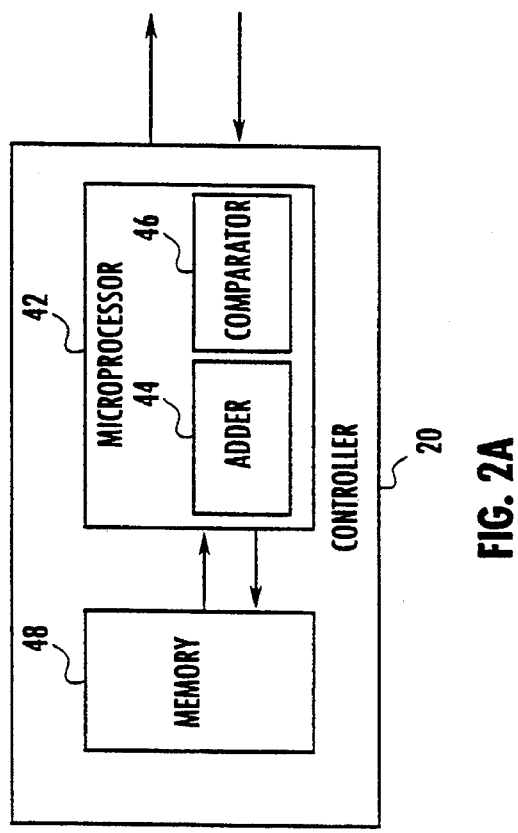
FIG. 2B
FIG. 2A

FAST AUTOMATIC TUNING OF A FEEDBACK CONTROLLER

RELATED APPLICATION

This application is a continuation-in-part of U.S. patent application Ser. No. 08/291,283 filed Aug. 16, 1994, entitled "Pattern Recognition Adaptive Controller" which is a continuation-in-part of Ser. No. 908,583, Oct. 29, 1992, U.S. Pat. No. 5,355,305 issued Oct. 11, 1994.

FIELD OF INVENTION

This invention relates to an apparatus and method for automatically tuning a feedback control system by determining the system control parameters based on estimates of process time delay, process time constant and process gain values from a step change in feedback controller output.

BACKGROUND OF INVENTION

Single-loop feedback controllers ("controllers") are commonly employed in many processes, including maintaining temperature, humidity, pressure, and flow rates for heating, ventilating, and air-conditioning equipment. For example, in an air conditioning system, a controller may be used to control the flow of chilled water through a cooling coil. In such a system, the controller adjusts the water flow rate based on a feedback signal indicative of the temperature of the air discharged from the coil (the "controlled variable"). The feedback signal is generated by a sensor disposed to monitor the controlled variable.

The object of such controllers is to control the system in such a way as to maintain the controlled variable, as sensed by the feedback signal, at a desired level (the "setpoint"). For example, the controller of an air conditioning system attempts to maintain the temperature of the air discharged from the system at a specific level. When the actual temperature of the discharged air deviates from the desired temperature, the controller must appropriately adjust the flow of the chilled water to bring the actual air temperature back in line with the desired air temperature. Thus, if the feedback signal indicates that the actual air temperature is colder than the desired temperature, the controller will cause the flow rate of chilled water to decrease, which will cause the actual temperature of the discharged air to increase. Likewise, if the feedback signal indicates that the actual air temperature is warmer than the desired temperature, the controller will cause the flow rate of chilled water to increase, which will cause the actual temperature of the discharged air to decrease.

Similarly, an automobile cruise controller attempts to maintain a constant speed. When the actual speed varies from the desired speed the controller must adjust the accelerator to bring the actual speed back in line with the desired speed.

An ideal feedback control system would be able to maintain the controlled variable at the setpoint based only on the feedback signal. However, actual feedback control systems require additional inputs known as control parameters. Control parameters are values used by a controller to determine how to control a system based on the feedback signal and the setpoint.

One method for controlling a closed loop system, known as proportional plus integral control (PI), is described in R. W. Haines, *HVAC Systems Design Handbook*, TAB Professional and Reference Books, Blue Ridge Summit, Pa. (1988). A PI controller requires two control parameters: the proportional gain and the integral time.

As these control parameters directly affect the performance and stability of a PI controller, it is important to determine the appropriate values of these parameters. However, the appropriate values for these parameters may change over time as the system is used. For example, the dynamics of a process may be altered by heat exchanger fouling, inherent nonlinear behavior, ambient variations, flow rate changes, large and frequent disturbances, and unusual operations status, such as failures, startup and shutdown. The process of adjusting the control parameters of a controller to compensate for such system changes is called retuning. If a controller is not retuned, the control response may be poor. For example, the controlled variable may become unstable or oscillate widely with respect to the setpoint. Thus, to insure adequate performance, controllers must be periodically retuned with new control parameter values.

The various tuning methods which have been developed to determine the appropriate values of the control parameters for PI controllers fall into three general categories. These categories are: manual tuning, autotuning, and adaptive control.

Manual tuning methods require an operator to run different test or trial and error procedures to determine the appropriate control parameters. Some manual tuning methods are described in D. E. Seborg, T. F. Edgar, and D. A. Mellichamp, *Process Dynamics and Control*, John Wiley & Sons, New York (1989) and A. B. Corripio, *Tuning of Industrial Control Systems*, Instrument Society of America, Research Triangle Park, N.C. (1990). Manual tuning methods have the obvious disadvantage of requiring large amounts of operator time and expertise.

Autotuning methods require an operator to periodically initiate tuning procedures, during which the controller will automatically determine the appropriate control parameters. The control parameters thus set will remain unchanged until the next tuning procedure. Some autotuning procedures are described in K. J. Aström and T. Hägglund, *Automatic Tuning of PID Controllers*, Instrument Society of America, Research Triangle Park, N.C. (1988). While autotuning requires less operator time than manual tuning methods, it still requires operator intervention.

With adaptive control methods, the control parameters are automatically adjusted during normal operation to adapt to changes in process dynamics. Thus, no operator intervention is required. Further, the control parameters are continuously updated to prevent the degraded performance which may occur between the tunings of the other methods.

Numerous adaptive control methods have been developed. See, for example, C. J. Harris and S. A. Billings, *Self-Tuning and Adaptive Control: Theory and Applications*, Peter Peregrinus LTD (1981). There are three main approaches to adaptive control: model reference adaptive control ("MRAC"), self-tuning control, and pattern recognition adaptive control ("PRAC"). The first two approaches, MRAC and self-tuning, rely on system models which are generally quite complex. The complexity of the models is necessitated by the need to anticipate unusual or abnormal operating conditions. Specifically, MRAC involves adjusting the control parameters until the response of the system to a command signal follows the response of a reference model. Self-tuning control involves determining the parameters of a process model on-line and adjusting the control parameters based upon the parameters of the process model.

Methods for performing MRAC and self-tuning control are described in K. J. Aström and B. Wittenmark, Adaptive Control, Addison-Wesley Publishing Company (1989).

With PRAC, parameters that characterize the pattern of the closed-loop response are determined after significant setpoint changes or load disturbances. The control parameters are then adjusted based upon the characteristic parameters of the closed-loop response.

A pattern recognition adaptive controller known as EXACT is described by T. W. Kraus and T. J. Myron, "Self-Tuning PID Controller uses Pattern Recognition Approach," Control Engineering, pp. 106–111, June 1984, E. H. Bristol and T. W. Kraus, "Life with Pattern Adaptation," *Proceedings* 1984 *American Control Conference*, pp. 888–892, San Diego, Calif. (1984), and K. J. Aström and T. Hägglund, *Automatic Tuning of PID Controllers,* Instrument Society of America, Research Triangle Park, N.C. (1988). The EXACT controller is also alleged to be embodied in U.S. Pat. No. Re. 33,267 issued to T. W. Kraus. The EXACT method, like other adaptive control methods, does not require operator intervention to adjust the control parameters under normal operation. However, before normal operation may begin, EXACT requires a carefully supervised startup and testing period. During this period, an engineer must determine the optimal initial values for controller gain, integral time, and derivative time. The engineer must also determine the anticipated noise band and maximum wait time of the process. The noise band is a value representative of the expected amplitude of noise on the feedback signal. The maximum wait time is the maximum time the EXACT algorithm will wait for a second peak in the feedback signal after detecting a first peak. Further, before an EXACT-based controller is put into normal use, the operator may also specify other parameters, such as the maximum damping factor, the maximum overshoot, the parameter change limit, the derivative factor, and the step size.

In the EXACT method, the value of the parameter change limit, which may be supplied as a predetermined constant or entered by a user, defines a range within which the parameter values of the controller are considered valid. For example, the EXACT method will not set the proportional gain of a controller to a value that exceeds the upper limit of the range defined by the parameter change limit. By specifying a valid parameter range, the EXACT method prevents the controller from using the extreme parameter values that may be a result of hardware or software errors or deficiencies. However, by constraining the parameters to values that fall within a designated range, the EXACT method prevents the use of parameter values outside the range even when such values would provide improved performance.

A second known pattern recognition adaptive controller is described by Chuck Rohrer and Clay G. Nelser in "Self-Tuning Using a Pattern Recognition Approach," Johnson Controls, Inc., Research Brief 228 (Jun. 13, 1986). The Rohrer controller calculates the optimal control parameters based on a damping factor, which in turn is determined by the slopes of the feedback signal. Similar to EXACT, the Rohrer method requires an engineer to enter a variety of initial values before normal operation may commence. Specifically, an operator must specify the initial values for a proportional band, an integral time, a deadband, a tune noise band, a tune change factor, an input filter, and an output filter.

Thus, both EXACT and the Rohrer controller require an operator to enter numerous control parameters before normal operation may begin. The more numerous the operator selected control parameters, the more difficult it is to adjust a pattern recognition adaptive controller for optimal performance, and the longer it takes to prepare a pattern recognition adaptive controller for operation.

The majority of controllers, including PRAC controllers, are shipped to customers with default parameter settings because of lack of time for manually tuning a system. For a number of systems, these initial control parameter settings are not appropriate and directly affect the performance of the controller.

Manual tuning of loops can take a long time, especially for processes with slow dynamics, such as the thermal response of a room. Thus, there is a need for an autotuner that can be used with existing and future control systems. Different methods for autotuning PID controllers are described by Äström, K. J., and T. Hägglund, *Automatic Tuning of PID Controllers,* Instrument Society of American, Research Triangle Park, N.C., 1988, and Seborg, D. E. T., T. F. Edgar, and D. A. Mellichamp, *Process Dynamics and Control,* John Wiley & sons, 1989. Several methods are based on the open loop transient response to a step change in controller output and other methods are based on the frequency response while under some form of feedback control. Open loop step response methods are sensitive to load disturbances, and frequency response methods require a large amount of time to tune systems with long time constants.

One famous open loop tuning method is the Ziegler-Nichols transient response method. This method characterizes the response to a step change in controller output and can be used for both self-regulating and non-self-regulating systems. (A self-regulating process is stable without feedback control.) With this method, the user must estimate the steepest slope and the time at which the steepest slope occurs. For noisy systems, it is difficult to accurately estimate the steepest slope and time of steepest slope. Thus, it is difficult to automate the Ziegler-Nichols step response method in a computer control system.

An open loop step response method that is less sensitive to noise than the Ziegler-Nichols method is described by Nishikawa, Yoshikazu, Nobuo Sannomiya, Tokuji Ohta, and Haruki Tanaka, "A Method for Autotuning of PID Control Parameters," *Automatica,* Volume 20, No. 3, 1984. Characteristic areas are used to determine the time delay and time constant which requires the process output to reach a final steady-state value. For some systems, it is often difficult to determine if a process has reached a steady-state. In many systems, if the test is stopped too early, the time delay and time constant estimates may be significantly different than the actual values. For example, if a test is stopped after three time constants of the first order response, then the estimated time constant equals 78% of the actual time constant, and if the test is stopped after two time constants, then the estimated time constant equals 60% of the actual time constant.

Another famous open loop tuning method is the Ziegler-Nichols continuous cycling method. This is a frequency response method that requires the user to increase the controller gain until the process output continuously cycles with a constant amplitude. U.S. Pat. No. 4,549,123 (1985), Hägglund, T. and K. J. Äström, Method and an Apparatus in Tuning a PID-Regulator, describes a frequency response tuning method which is easier to automate and known as the relay oscillation method. These oscillation methods, however, require an actuator to move back and forth to cause the system to oscillate.

As is evident by the foregoing discussion, it is desirable to provide an automatic tuning controller which quickly estimates parameters of a first-order plus time-delay model from an open loop step test of a self-regulating system.

It is further desirable to provide an automatic tuning controller which provides accurate estimation of process parameters when the test is stopped before the process output reaches a final steady-state. This would enable a control engineer to bring the loop on line in a relatively short amount of time. In the HVAC industry, it is desirable to have a fast tuning method for slow loops, such as the thermal response of a room. Additionally, it is desirable to provide an autotuning controller which provides accurate estimates of time delay, time constant, and process gain from noisy signals. Finally, it is desirable to provide an automatic tuning controller with an ability to automatically stop the step test so the user does not have to monitor the entire test.

SUMMARY OF INVENTION

The present invention provides a method of automatically determining the control parameters of a feedback controller disposed to control a process, which includes the steps of specifying parameters for a step test, determining control limits after a process is in a steady-state, estimating a process time delay value for the process, estimating the characteristic areas, stopping the step test; estimating a process time constant and a process gain value and determining control parameters for the controller.

The present invention further provides a feedback controller having automatically determined control parameters including means for specifying the parameters for a step test, means for determining the control limits after a process is in a steady-state, means for estimating a process time delay value for the process, means for estimating the characteristic areas; means for stopping the step test; means for estimating a process time constant and a process gain value and means for determining the control parameters for the controller.

BRIEF DESCRIPTION OF THE DRAWINGS

The features of the present invention, which are believed to be novel, are set forth with particularity in the appended claims. The invention, together with further objects and advantages thereof, may best be understood by making reference to the following description taken in conjunction with the accompanying drawings wherein:

FIG. 2A is a block diagram illustrating a pattern recognition adaptive controller in accordance with the preferred embodiment of the present invention;

FIG. 2B is a block diagram illustrating a pattern recognition adaptive controller in accordance with an alternative embodiment of the present invention;

DETAILED DESCRIPTION

Figure 1:
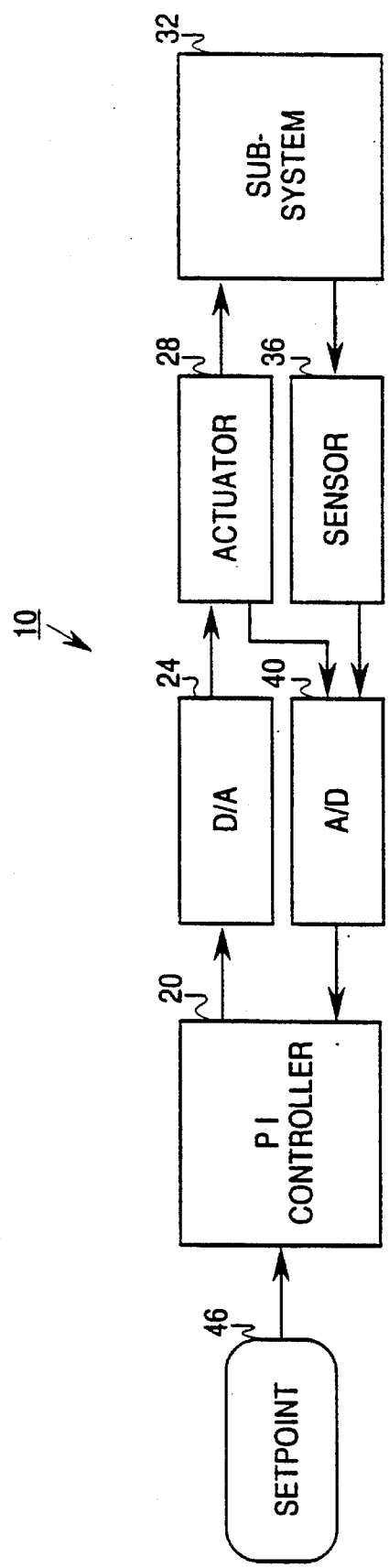
FIG. 1 is a block diagram illustrating the principal components of a closed loop feedback system in accordance with the present invention.

FIG. 1 shows the hardware configuration of a closed-loop PI control system 10 embodying the present invention. System 10 generally includes a PI controller 20, an actuator 28, a subsystem 32 which controls a process, and a sensor 36. Controller 20 is coupled to actuator 28 through a digital to analog converter 24, and to sensor 36 through an analog to digital converter 40.

Actuator 28 is disposed to affect the operation of subsystem 32. For example, subsystem 32 may be an air conditioning subsystem for which actuator 28 controls a valve through which chilled water passes. Sensor 36 is disposed to monitor the controlled variable of subsystem 32, which is affected by actuator 28. Actuator 28 is appropriately chosen for the process being controlled and may be mechanical, hydraulic, electronic or any combination thereof.

In one embodiment control system 10 is for temperature control. Sensor 36 may be a thermometer disposed to monitor the temperature of air that is discharged from subsystem 32 which may be an HVAC system. In such an application control system 10 adjusts the position of an actuator, such as a damper or valve, which controls the temperature of the output air of the HVAC system. In another temperature application control system 10 is for controlling the temperature of a chemical or biological process such as in a distillation column or a chemical reactor and sensor 36 may be a thermometer and the boil-up of the distillation column is manipulated.

In a vehicle application control system 10 is for cruise control, sensor 36 may be a velocity sensor (speedometer), and subsystem 32 may be an automobile engine. In another vehicular application control system 10 is for maintaining a vehicle or ship on a desired heading or course steering (autopilot), sensor 36 may be a heading detector (compass), and subsystem 32 the steering system or turning regulator of the ship.

In another alternative embodiment control system 10 is for controlling combustion and sensor 36 measures the oxygen content of a flue gas and the fuel to air ratio is manipulated. In another chemical application control system 10 is for controlling a filtration or ultrafiltration process such as dialysis and sensor 36 may be a flow sensor and the weight loss of the filtration system is manipulated.

In still another alternative embodiment control system 10 is for controlling the level of fluid in a vessel, such as pulp in a pulp mill and sensor 36 is a level detector. In another papermaking application control system 10 is for controlling the rate of drying or moisture content in a process, such as the moisture content in a wet pup sheet and sensor 36 may be a moisture detector and the steam pressure (which effects the drying rate) is manipulated.

In another alternative embodiment control system 10 is for controlling the position of an electromagnetic actuator by varying the current to the windings, sensor 36 may be a current sensor, and subsystem 32 may be a current source.

Whatever the application, sensor 36 transmits a signal representative of the controlled variable (temperature, speed, etc.) to analog to digital converter 40. This controlled variable signal is preferably filtered by an anti-aliasing filter (not shown) to remove high frequency signals. Analog to digital converter 40 samples the filtered controlled variable signal and transmits a sampled feedback signal to controller 20. Controller 20 compares the sampled feedback signal to a setpoint 46, which is representative of the desired value of the controlled variable, to determine the extent to which the controlled variable has diverged from setpoint 46. Such divergences may be caused by setpoint changes or load disturbances. Based on that comparison, controller 20 determines how actuator 28 should respond to cause the controlled variable to return to setpoint 46. Once the appropriate response is determined, controller 20 generates a control signal through digital to analog converter 24 to actuator 28. In response to the control signal, actuator 28 appropriately alters the operation of subsystem 32. During this procedure, the control parameters of controller 20 are retuned to compensate for any changes in the process. Preferably, the new PI values are chosen to minimize the integrated absolute errors between setpoint 46 and the controlled variable.

A crucial factor in the efficiency and performance of system 10 is the accuracy with which controller 20 determines the new PI values after any given disturbance. A pattern recognition adaptive controller implemented in accordance with the present invention makes this determination by characterizing the closed loop response, as the response is reflected in the sampled feedback signal.

Two dimensionless parameters, a damping factor and a response time, are used to characterize the closed loop response. The damping factor is based upon an estimate of the slope of the sampled feedback signal, and the response time is a measurement of the speed of response of subsystem 32. From these two parameters, the optimal gain and integral time of controller 20 are determined. Specifically, the gain of controller 20 is adjusted based upon the estimated damping factor, and the integral time of controller 20 is adjusted based upon the closed loop response time.

FIG. 2A shows pattern recognition adaptive controller 20 according to the preferred embodiment of the present invention. According to this embodiment, controller 20 internally incorporates the hardware and software required to implement the pattern recognition adaptive control process. The hardware may include a microprocessor 42 and memory 48. Microprocessor 42 includes an adder 44 and a comparator 46 and operates according to program instructions stored in memory 48. Memory 48 may be ROM, EPROM, EEPROM, RAM loaded with the appropriate instructions, or other information storage means.

FIG. 2B shows an alternative embodiment of the present invention. According to this embodiment, the process of determining optimal control parameter values is implemented by an external processing unit 62, such as a personal computer. The processing unit 62 is connected to a PI controller 60 through an interface 64, such as a serial port. The processing unit 62 receives the control signal generated by controller 60 via a line 66 and the feedback signal from sensor 36 via a line 68. Based on these signals, processing unit 62 determines the optimal control parameters for controller 60. These parameters are then transmitted to controller 60 through interface 64. External processing unit 62 may be connected to controller 60 to provide continuous parameter retuning, or may be connected thereto from time to time to provide retuning on a periodic basis. When processing unit 62 is not connected to controller 60, the operating parameters of controller 60 remain constant at the values generated by processing unit 62 during the most recent retuning operation. A more detailed description of the preferred embodiment of the present invention will now be made with reference to FIG. 3.

Figure 3:
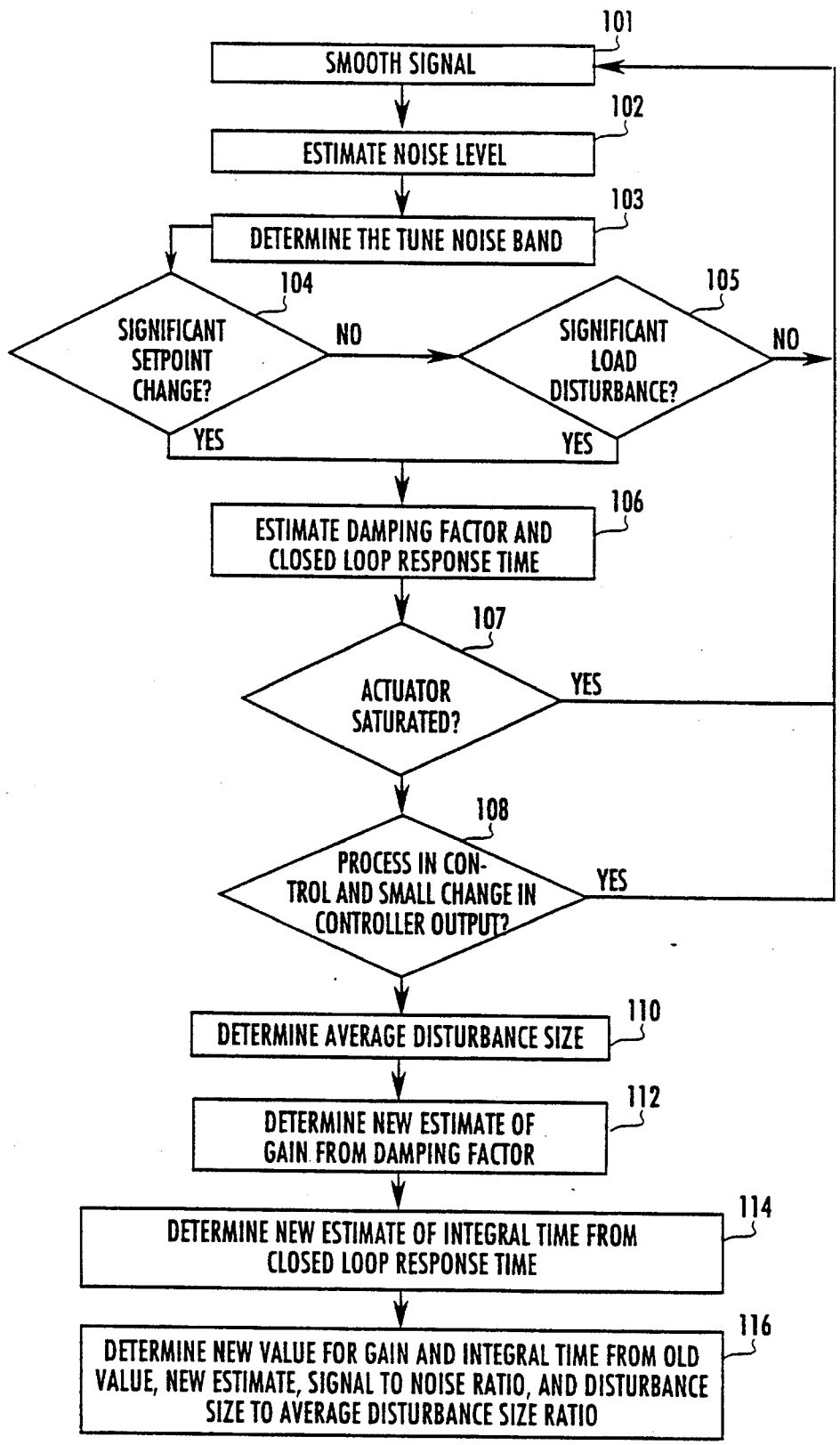
FIG. 3 is a flow diagram illustrating the manner in which the controller of FIG. 1 may be implemented for dynamically adjusting control parameters in accordance with the present invention.

FIG. 3 is a flowchart illustrating the manner in which controller 20 may be implemented for determining the optimal PI values in accordance with a preferred embodiment of the present invention. The implementation generally comprises step 101 for smoothing the sampled feedback signal, step 102 for estimating a noise level, step 103 for determining a tune noise band, step 104 for determining if a significant setpoint change has occurred, and step 105 for determining if a significant load disturbance has occurred. The implementation further comprises step 106 for estimating a damping factor and closed loop response time, step 107 for determining if actuator 28 is saturated, step 108 for determining whether there is a small change in the controller output and the process is in control, step 110 for determining an average disturbance size, step 112 for determining an estimated gain, step 114 for determining an estimated integral time, and step 116 for determining a new gain and a new integral time. A more detailed description of these steps will now be given.

In step 101, a smoothed signal is estimated from the sampled feedback signal. The smoothed signal is based upon fitting a quadratic function through five evenly spaced points. Smoothing techniques are also used to estimate the slopes of the sampled feedback signal. The estimated slope of the sampled feedback signal ("estimated slope") is based upon fitting a quadratic function through seven evenly spaced points.

Specifically, a smoothed signal is determined according to the method for smoothing a discrete set of noisy data described in Francis Schied, *Shaum's Outline Series— Theory and Problems of Numerical Analysis*, McGraw-Hill Book Company, New York (1968). This method is based upon minimizing the sum of square of errors to a polynomial approximation. For example, Equation 1 is used to minimize the sum of squares for a quadratic function for five evenly spaced points, where $\tilde{y}_t$ is the smoothed signal value at time t, $y_t$ is the actual value of the sampled feedback signal at time t, $y_{t+jT}$ is the actual value of the sampled feedback signal at time t+jT, and T is the time between samples ("time step").

$$\tilde{y}_t = \frac{1}{70}(-6y_{t-2T} + 24y_{t-T} + 34y_t + 24y_{t+T} - 6y_{t+2T}) \quad (1)$$

Unlike many other noise-compensation techniques, such as low-pass filtering, smoothing techniques do not change the patterns of a closed loop response, and therefore do not require a tradeoff between changing the shape of the signal and removing noise. Equation 2 is used to estimate the slope of the sampled feedback signal at time t based upon seven evenly spaced points.

$$\frac{dy_t}{dt} = \frac{1}{28T}(-3y_{t-3T} - 2y_{t-2T} - y_{t-T} + y_{t+T} + 2y_{t+2T} + 3y_{t+3T}) \quad (2)$$

When determining the slopes, it is important to determine the time that the sampled feedback signal reaches an extrema, and the value of the extrema. An extrema is a point where a signal reverses direction. Thus, a local extrema exists at the points where the slope of the sampled feedback signal changes sign. A simple procedure for determining local extrema is to compute the product of the current estimate of the slope and the previous estimate of the slope. When this product is negative, then a local extrema exists. Further, because of the limited resolution of A/D converters, an extrema may also be characterized by the transition from a non-zero slope to a slope of zero. When such is the case, the zero slope is indicative of a change in direction that was too small, relative to the resolution of the A/D converter, to be distinguished from a constant signal.

Figure 4:
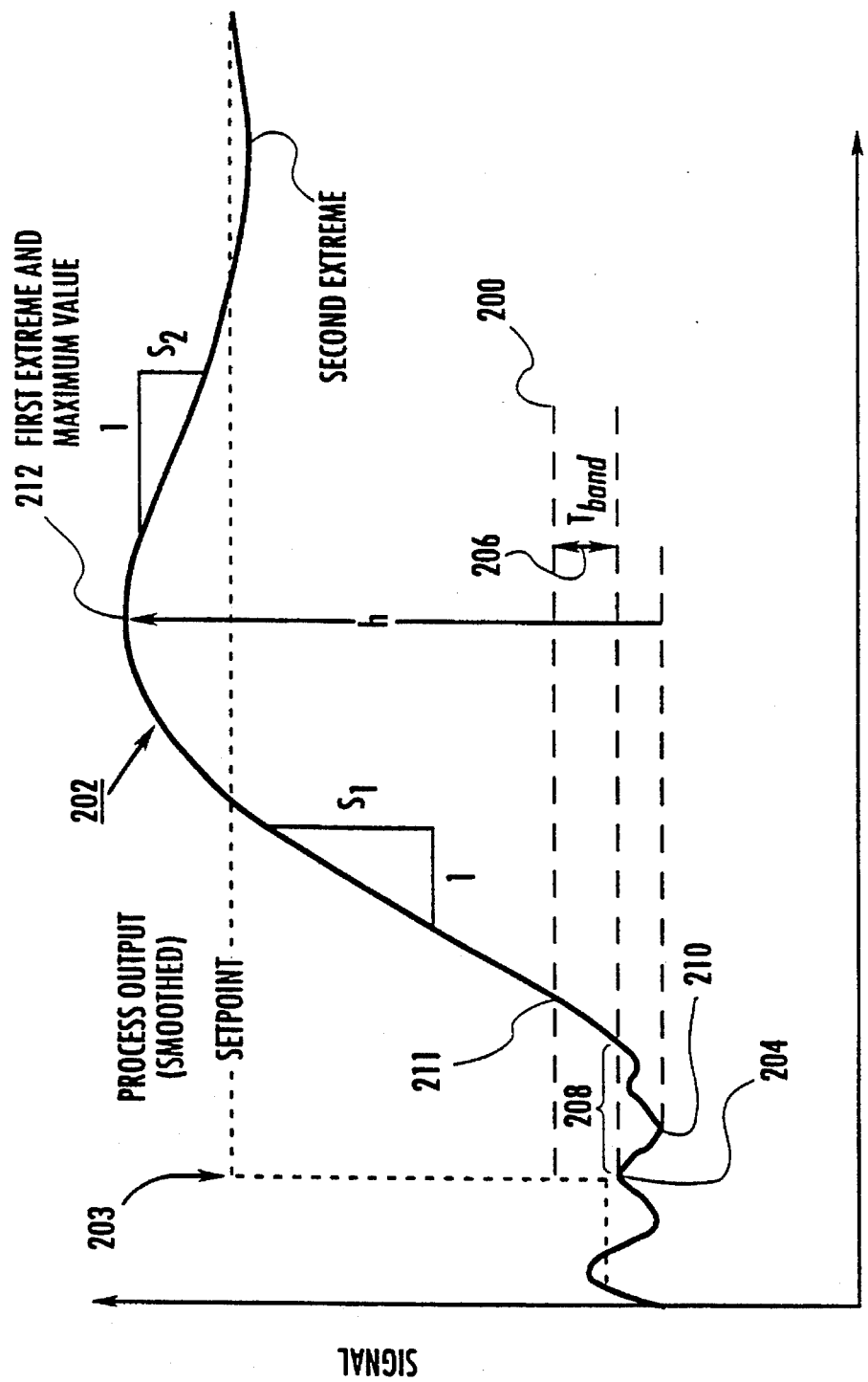
FIG. 4 is a graph illustrating the timing for determining extrema in a smoothed signal after a positive setpoint change.

To correctly characterize a closed loop response, it is necessary to search for the slopes and extrema of the smoothed signal at the proper time. The time to begin the search for slopes and extrema is different for load disturbances and setpoint changes. The process of determining the values necessary to determine the relevant slopes of the smoothed signal will now be described in detail with reference to FIG. 4.

For setpoint changes, the search for the minimum and maximum values (210 and 212, respectively) of a smoothed signal 202 begins immediately after a setpoint change 203 has occurred. In contrast, the search for extrema and slopes begins when the smoothed signal 202 falls outside a tune noise range ("$T_{range}$") determined by the magnitude of the smoothed signal 202 at the time of the setpoint change 204 and the tune noise band ("$T_{band}$") 206. Specifically, for positive setpoint changes, the search for extrema and slopes begins when the smoothed signal 202 exceeds an upper limit 200. In the illustrated example, the smoothed signal 202 exceeds the upper limit 200 at a point 211. The upper limit 200 is equal to the smoothed signal 202 at the time of the setpoint change 204 plus the tune noise band 206. For negative setpoint changes, the search for extrema and slopes begins when the smoothed signal 202 falls below a lower limit (not shown) defined by the smoothed signal 202 at the time of the setpoint change 204 minus the tune noise band 206. The search for extrema is thus delayed to prevent the inaccurate characterization of a closed loop response based on any small oscillations 208 in the smoothed signal 202 which may occur following the setpoint change 203. The determination of a tune noise band will be discussed in greater detail below.

For significant load disturbances, the search for a first extrema and the minimum and maximum values begins immediately after a significant load disturbance has been identified. A significant load disturbance occurs when the smoothed signal exceeds the upper tune noise limit for two consecutive samples, or falls below the lower tune noise limit for two consecutive samples. After the first extremum is located, the search begins for the minimum and maximum slopes, and for second and third extrema.

If there is a high level of noise in the sampled feedback signal, there will be large differences between the sampled feedback signal and the smoothed signal determined in step 101. The difference between the sampled feedback signal and the smoothed signal is a measure of the noise level. During step 102, an exponentially weighted moving average, as described in S. M. Pandit and S. M. Wu, *Timer Series and System Analysis with Applications*, John Wiley & Sons, Inc., New York (1983), is used to determine a long-term average of the noise level ("estimated noise level") of the sampled feedback signal. The exponentially weighted moving average is a digital version of an exponential filter, as described in D. E. Seborg, T. F. Edgar, and D. A. Mellichamp, *Process Dynamics and Control*, John Wiley & Sons, New York (1989).

Specifically, an exponentially weighted moving average is determined according to Equation 3, where $\bar{n}_r$ is the estimate of noise for sample r, r is the running index of the number of samples used in the noise estimate, $\bar{n}_{r-1}$ is the estimate of noise for sample r−1, $\lambda$ is an exponential smoothing constant, $\bar{y}_r$ is the estimate of the signal for sample r based upon a 5 point quadratic, and $y_r$ is the actual value of the signal for sample r.

$$\bar{n}_r = \bar{n}_{r-1} + \lambda(|\bar{y}_r - y_r| - \bar{n}_{r-1}) \tag{3}$$

The value for the exponential smoothing constant is typically between 0.0 and 0.3, and, in accordance with one embodiment of the present invention, is chosen to be 0.001 to correspond to a time constant for a first order system of approximately 1000 sampling intervals. The initial value of the weighted moving average is determined by the first $1/\lambda$ samples according to Equation 4.

$$\bar{n}_r = \bar{n}_{r-1} + \frac{1}{r}(|\bar{y}_r - y_r| - \bar{n}_{r-1}) \tag{4}$$

In step 103, a tune noise band is determined. The tune noise band specifies the minimum size of the error (the difference between the setpoint and the smoothed feedback signal) which must occur before a pattern is identified as a setpoint change or load disturbance.

The tune noise band is determined according to Equation 5, where $T_{band}$ is the tune noise band, $Y_{max}$ is the maximum expected value for the process output, $Y_{min}$ is the minimum expected value for the process output, $R_{min}$ is the minimum resolution of the A/D or D/A converter used in the control system, $\alpha$ is a constant equal to 5.33, and $\bar{n}$ is the average noise level as determined from Equation 3. The first term of Equation 5 is used to prevent adjustment of the controller parameters when there is a small limit cycle due to the error associated with quantization. The second term adjusts the tune noise band when there is a large amount of noise in the controlled variable signal. The resolution of the A/D or D/A converter is equal to 1/(2Bits), where Bits is the number of bits of resolution for the A/D or D/A converter.

$$T_{band} = \text{maximum}(4(y_{max} - y_{min}) R_{min}, \alpha\bar{n}) \tag{5}$$

As is evident by Equation 5, the tune noise band increases as the average noise level increases. The value of 5.33 for the constant e is determined from optimizations that minimized the integrated absolute error for a wide range of systems.

In step 104, it is determined whether a significant setpoint change has occurred. A significant setpoint change is any setpoint change which has a greater magnitude than the tune noise band, as determined in step 103. If a significant setpoint change has occurred, control passes to step 106. Otherwise, control passes to step 105.

In step 105, it is determined whether a significant load disturbance has occurred. Specifically, the difference ("error") between the setpoint and the smoothed signal is compared with the tune noise band. If the absolute value of the error exceeds the tune noise band for two consecutive samples, then a significant load disturbance is considered to have occurred.

If either a significant setpoint change or a significant load disturbance occurs, execution continues to step 106. Otherwise, controller 20 waits for the next feedback signal sample and, when received, begins execution again at step 101. During step 106, a damping factor and a closed loop response time are determined from the smoothed signal and the estimated slope.

Specifically, when the smoothed signal is underdamped, Equation 6 is used to determine a damping factor, unless $S_1$ and $S_2$ cannot be ascertained within a specified time period.

$$d_{slope}=S_2/S_1 \qquad (6)$$

For setpoint changes, $S_1$ is the maximum of the absolute value of the slope between the time the smoothed signal falls outside the $T_{range}$ and the time of the first extremum, and $S_2$ is the maximum of the absolute value of the slope between the time of the first extremum and the second extremum. For load disturbances, $S_1$ is the maximum of the absolute value of the slope between the time of the first extremum and the second extremum, and $S_2$ is the maximum of the absolute value of the slope between the time of the second extremum and the third extremum. Thus, for significant setpoint changes, the damping factor is determined within two reversals of the controlled variable and for significant load disturbances, the damping factor is determined within three reversals of the controlled variable.

The maximum amount of time for detecting the damping factor and the response time after a significant setpoint change or a significant load disturbance is called the wait time. The optimal amount of wait time depends upon the ratios of sampling interval to the dominant time constant of the process, and the sampling interval to dead time.

An appropriate wait time may be determined using numerical simulations. Equation 7 is used to determine the minimum wait time for a process after a significant setpoint change, where $T_{wait,set}$ is the wait time, T is the time between samples, and $\tau$ is the time constant of the process.

$$\frac{T_{wait,set}}{T} = 6.83 + 5.34 \frac{\tau}{T} \qquad (7)$$

Equation 8 is used to determine the minimum wait time for a process after a significant load disturbance, where $T_{wait,load}$ is the wait time, and $\tau$ is the time constant of the process.

$$\frac{T_{wait,load}}{T} = 7.54 + 6.72 \frac{\tau}{T} \qquad (8)$$

As mentioned above, Equation 6 is used to determine the damping factor when $S_1$ and $S_2$ are determined within the specified wait time and there is some overshoot in the smoothed signal. If the second slope, $S_2$, is not determined within the wait time, then the damping factor is set to zero. Likewise, if there is no overshoot and $h<2\ T_{band}$, the damping factor is set to zero. Further, if $S_2$ is larger than $S_1$, which indicates an unstable response, the damping factor is set to one.

The closed loop response time ("$\theta$") is determined by Equation 9, where h is the height of the response, $S_1$ is determined as described above, and T is the sampling interval. However, if $S_2$ is larger than $S_1$, then the response time is determined by the equation $\theta=h/(S_{2T})$. Further, if $S_2$ is not determined within the wait time, or if there is no overshoot and $h<2T_{band}$, then $\theta$ is not determined.

$$\theta = \frac{h}{s_1 T} \qquad (9)$$

The height of a response, in turn, is calculated by Equation 10 both for setpoint changes and for load disturbances.

$$h = \tilde{Y}_{maximum} - \tilde{Y}_{minimum} \qquad (10)$$

For Equation 10, h represents the height of the response, $\tilde{Y}_{maximum}$ is the maximum value of the smoothed signal, and $\tilde{Y}_{minimum}$ is the minimum value of the smoothed signal.

For a response with overshoot or for an unstable response following a load disturbance, the height of the response is determined between the time of the disturbance and the third extremum. For a sluggish response, the height of the response is determined between the time of the load disturbance and the time of the load disturbance plus the wait time for load disturbances.

During step 107, it is determined whether actuator 28 has been saturated. An actuator can become saturated after a large disturbance in which the load exceeds the range of the controlled variable. If actuator 28 saturates and the load cannot be met, then the gain and integral time are not updated because controller 20 is doing all it can to move the controlled variable towards setpoint 46. Instead, controller 20 waits for the next feedback signal sample and execution begins again at step 101. If the load can be met and actuator 28 is not saturated, then control passes to step 110.

During step 108, it is determined whether a small change in the controller output has occurred and whether the process is in control. A change is considered small if the controller output moves less than four times the resolution of the D/A converter. The change in process output is determined by subtracting the minimum controller output from the maximum controller output during the time period that the response is being characterized. The process is considered "in control" when any one sample of the smoothed estimate of the process output is between the upper and lower tune noise limits. If the process is in control and the change is small, control passes back to step 101. Otherwise it continues to step 110. This step compensates for possible imprecision in the devices, such as valves, that are being used to control the relevant process. For example, a small change in controller output may result in no change in the output of a valve.

During step 110, an average disturbance size is determined. The average disturbance size is a measure of the average size of a disturbance or setpoint change. An exponentially weighted moving average is used to determine the average disturbance size. The average disturbance size is used to adjust the gain and integral term of controller 20 based upon the size of the most recent disturbance relative to the size of the average disturbance.

The size of a disturbance is determined by Equation 11 where $\sigma$ is the disturbance size, Maximum is function that determines the largest number in a list, $\tilde{y}_{maximum}$ is maximum value of the smoothed feedback signal, Minimum is function that determines the smallest number in a list, and $\tilde{y}_{minimum}$ is minimum value of the smoothed feedback signal. Setpoint is the current setpoint for a load disturbance, and is the new setpoint in the case of a setpoint change.

$$\sigma = \text{Maximum}(\tilde{y}_{maximum}, \text{Setpoint}) - \text{Minimum}(\tilde{y}_{minimum}, \text{Setpoint}) \qquad (11)$$

Equation 12 is used to estimate an average disturbance size, where $\bar{\sigma}_p$ is the estimate of disturbance size based upon p patterns, p is the running index of the number of patterns characterized, $\lambda$ is the exponential smoothing constant, $\bar{\sigma}_{p-1}$ is the estimate of disturbance size based upon p−1 patterns, and $\sigma_p$ is $\sigma$ for disturbance p.

$$\bar{\sigma}_p = \bar{\sigma}_{p-1} + \lambda(\sigma_p - \bar{\sigma}_{p-1}) \qquad (12)$$

For the first $1/\lambda$ patterns, Equation 13 is used to determine the average disturbance size.

$$\bar{\sigma}_p = \bar{\sigma}_{p-1} + 1/p\ (\sigma_p - \bar{\sigma}_{p-1}) \qquad (13)$$

In step 112, an estimate for the gain ("estimated gain") is determined from an equation that is a function of the damping factor. The equation provides near optimal performance in terms of minimizing the integrated absolute error and is used for both load disturbances and setpoint changes.

Specifically, the ratio of the estimated gain to the present gain is determined by Equation 14, where $\hat{K}_{opt}$ is the estimated gain, K is the present value of the gain, and constants are supplied according to Table 1.

$$\frac{\hat{K}_{opt}}{K} = a_0 + a_1 d_{slope} + a_2 d_{slope}^2 \ldots + a_n d_{slope}^n \quad (14)$$

TABLE 1

| n | $a_0$ | $a_1$ | $a_2$ | $a_3$ | $a_4$ | S |
|---|-------|-------|-------|-------|-------|------|
| 1 | 1.163 | −0.829 |       |        |       | 7.43 |
| 2 | 1.230 | −1.525 | 0.804 |        |       | 1.44 |
| 3 | 1.254 | −1.939 | 1.969 | −0.831 |       | 1.03 |
| 4 | 1.264 | −2.199 | 3.347 | −3.204 | 1.272 | .97  |

The coefficient values of Table 1 are derived through linear regression to minimize Equation 15.

$$S = \sum_{j=1}^{2000} \left( \frac{K_{opt,j} - \hat{K}_{opt,j}}{K_j} \right)^2 \quad (15)$$

Then, the present gain is multiplied by the ratio determined by Equation 14 to yield the estimated gain for a response with a damping factor of 0.15.

In step 114, a new estimate of the integral time ("estimated integral time") is determined from an equation that is a function of the closed loop response time. This equation provides near-optimal performance and is used for both load disturbances and setpoint changes.

Specifically, the ratio of an estimated integral time to the actual sampling interval is determined by Equation 16, where $\hat{T}_{i,opt}$ is the estimate of optimal integral time, T is the sampling interval for controller 20, θ is the closed loop response time, and the constants are supplied according to Table 2.

$$\frac{\hat{T}_{i,opt}}{T} = b_0 + b_1\theta + b_2\theta^2 \ldots + b_n\theta^n \quad (16)$$

TABLE 2

| n | $b_0$ | $b_1$ | $b_2$ | $b_3$ | S |
|---|---------|-------|--------|-------|------|
| 1 | −3.429  | 1.285 |        |       | 2144 |
| 2 | −4.579  | 1.548 | −0.012 |       | 2122 |
| 3 | −14.357 | 4.713 | −0.319 | 0.009 | 1908 |

Then, the present sampling interval is multiplied by the ratio determined by Equation 16 to yield the estimated integral time. A lower limit on the estimated integral time is two sampling intervals.

In step 116, new values for gain and integral time ("new gain and new integral time values") are determined. The new gain and new integral time values replace the gain and integral time values that were used by controller 20 before the most recent significant load disturbance or significant setpoint change. The new gain and integral time values are based on the estimated gain and the estimated integral time determined in steps 112 and 114, respectively, the current values of gain and integral time, the size of the disturbance or setpoint change relative to the level of noise in the sampled feedback signal (the signal-to-noise ratio), and the size of the disturbance or setpoint change for the current pattern relative to the average size of the disturbances or setpoint changes for previous patterns (the disturbance size ratio).

If the signal-to-noise ratio is high and the disturbance size ratio is high, then the new gain and new integral time values are set equal to the estimated gain and estimated integral time. If the signal-to-noise ratio is small, or if the disturbance size ratio is small, then the values for the gain and integral time are not changed. However, the integral time is not updated from the estimate of the closed loop response time when the damping factor is zero.

Specifically, the new gain value is determined by Equation 17, where $K_{new}$ is the new value of gain for PI controller 20, $K_{old}$ is the gain currently being used in controller 20, $\lambda_{dist.-size}$ is an exponential smoothing constant which is a function of the disturbance-size ratio, $\lambda_{signal-noise}$ is an exponential smoothing constant which is a function of an signal-to-noise ratio, and $\hat{K}_{opt}$ is the estimated gain.

$$K_{new} = K_{old} + \lambda_{dist.-size}\lambda_{signal-noise}(\hat{K}_{opt} - K_{old}) \quad (17)$$

The new integral time value is determined by Equation 18, where $T_{i,new}$ is the new value of integral time for controller 20, $T_{i,old}$ is the integral time currently being used in controller 20, and $\hat{T}_{i,opt}$ is the estimated integral time.

$$T_{i,new} = T_{i,old} + \lambda_{dist.-size}\lambda_{signal-noise}(\hat{T}_{i,opt} - T_{i,old}) \quad (18)$$

The exponential smoothing constants, $\lambda_{dist.-size}$ and $\lambda_{signal-noise}$, vary between zero and one. If both smoothing constants are equal to one, then the new values for the gain and integral time are equal to the estimated values. If either one of the smoothing constants is zero, then the gain and integral time are not changed.

Whether the smoothing constants equal zero or one depends on their relationship to predetermined constants, $d_1$ and $d_2$ in the case of the disturbance size ratio, and $k_1$ and $k_2$ in the case of the signal to noise ratio.

If the disturbance-size ratio is less than $d_1$, then $\lambda_{dist.-size}$ is zero. If the disturbance-size ratio is greater than $d_2$, then $\lambda_{dist.-size}$ is one. If the disturbance-size ratio is between $d_1$ and $d_2$, then $\lambda_{dist.-size}$ is determined by Equation 19.

$$\lambda_{dist.-size} = \frac{\frac{h}{\bar{h}} - d_1}{d_2 - d_1} \quad (19)$$

In the presently preferred embodiment of the invention, $d_1$ equals 0.0 and $d_2$ equals 2.19. Further, $\lambda_{dist.-size}$ is set equal to one during the initial disturbances or setpoint changes to improve the convergence properties of the pattern recognition adaptive controller during startup. The first five to nine disturbances are typically considered to be initial disturbances.

Similarly, if the signal-to-noise ratio is less than $k_1$, then $\lambda_{signal-noise}$ is zero, and if the signal-to-noise ratio is greater than $k_2$, then $\lambda_{signal-noise}$ is one. When the signal-to-noise ratio falls between $k_1$ and $k_2$, then Equation 20 is used to determine $\lambda_{signal-noise}$.

$$\lambda_{signal-noise} = \frac{\frac{h}{T_{band}} - k_1}{k_2 - k_1} \quad (20)$$

In the presently preferred embodiment of the invention, $k_1$ equals 0.95 and $k_2$ equals 1.27.

An automatic tuning controller is used to estimate control parameters of any feedback control system based on a first-order plus time-delay model from an open loop step test. For example, the automatic tuning controller can be used in conjunction with PRAC 20 by determining the control parameters of self-regulating system 10 prior to entering the closed loop.

Generally, in order for autotuning controller 216 to determine appropriate control parameters for a system, autotuning controller 216 issues a command to step change the controller output after the process is at an initial steady-state. The controller output is step changed, for example, by adjusting the position of actuator 28, such as a damper or valve, which controls the temperature of the output air of the system. Controller 216 continues to monitor the system response and, after thee step test is stopped, determines process parameters based on measurements of the process output and the size and sign of the step change. Finally, these estimated process parameters are translated into system control parameters based on design relations relative to feedback controllers.

A first-order plus time-delay model is well-known in the art and frequently used to model first-order responses of processes in control systems. The general transfer function for a first-order plus time-delay model is:

$$G(s) = \frac{K e^{-\Theta s}}{1 + s\tau} \quad (21)$$

where:

K=process gain.

Θ=time delay.

τ=time constant.

s=complex variable which results from Laplace transformation.

Based on the first-order plus time-delay model, the time domain representation of the system response to a step change in controller output at time $t_s$, assuming the initial process output is at a steady-state condition, is given by:

$$y(t) = \begin{cases} y_i & \text{if } t \leq t_i \\ y_i + KM[1 - e^{-(t-t_i)/\tau}] & \text{if } t > t_i \end{cases} \quad (22)$$

where:

y(t)=process output at time t.

$y_i$=initial value of process output.

$t_i = t_s + \Theta$.

$t_s$=time of step change in controller output.

M=size of step change in controller output.

Figure 5B:
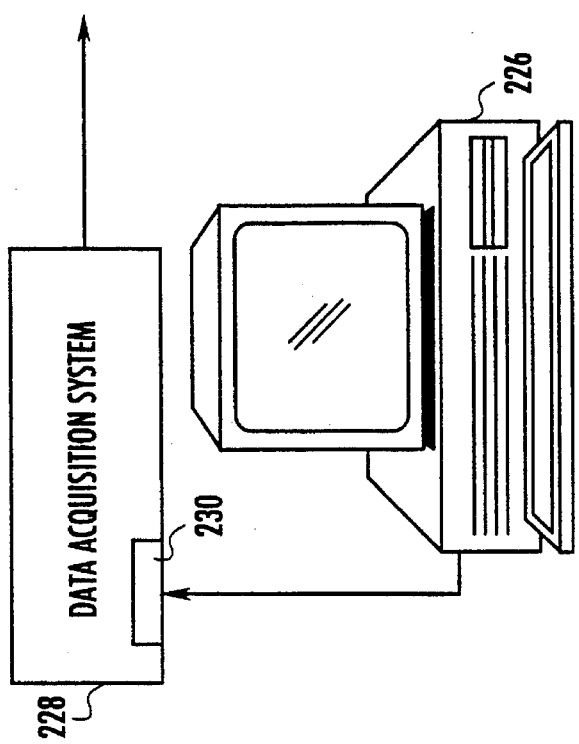
FIG. 5B is a block diagram illustrating an autotuning controller in accordance with an alternative embodiment of the present invention.
Figure 5A:
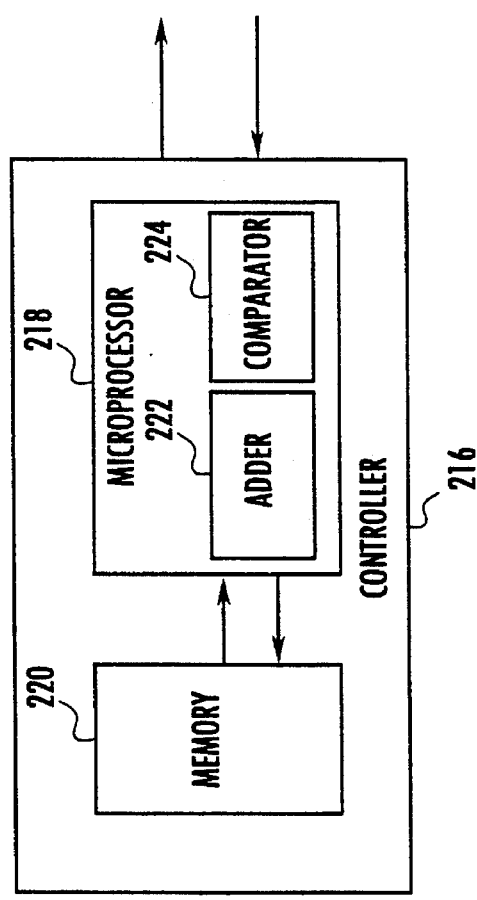
FIG. 5A is a block diagram illustrating an autotuning controller in accordance with the preferred embodiment of the present invention.

FIG. 5A shows automatic tuning controller 216 according to the preferred embodiment of the present invention. According to this embodiment, automatic tuning controller 216 internally incorporates the hardware and software required to implement the fast automatic tuning process. The hardware may include a microprocessor 218 and memory 220. Microprocessor 218 includes an adder 222 and a comparator 224 and operates according to program instructions stored in memory 220. Memory 220 may be ROM, EPROM, EEPROM, RAM loaded with the appropriate instructions, or other information storage means. By way of modification, automatic tuning controller 216 can be an analog controller instead of a digital controller.

FIG. 5B shows an alternative embodiment of the present invention. According to this embodiment, the process of determining optimal control parameter values is implemented by an external processing unit 226, such as a personal computer. The processing unit 226 is connected to a data acquisition system 228 through an interface 230, such as a serial port. External processing unit 226 may be connected to data acquisition system 228 to provide retuning on a periodic basis. When processing unit 226 is not connected to data acquisition system 228, the operating parameters of the system remain constant at the values generated by processing unit 226 during the most recent retuning operation. A more detailed description of the preferred embodiment of the present invention will now be made with reference to FIG. 6.

Figure 6:
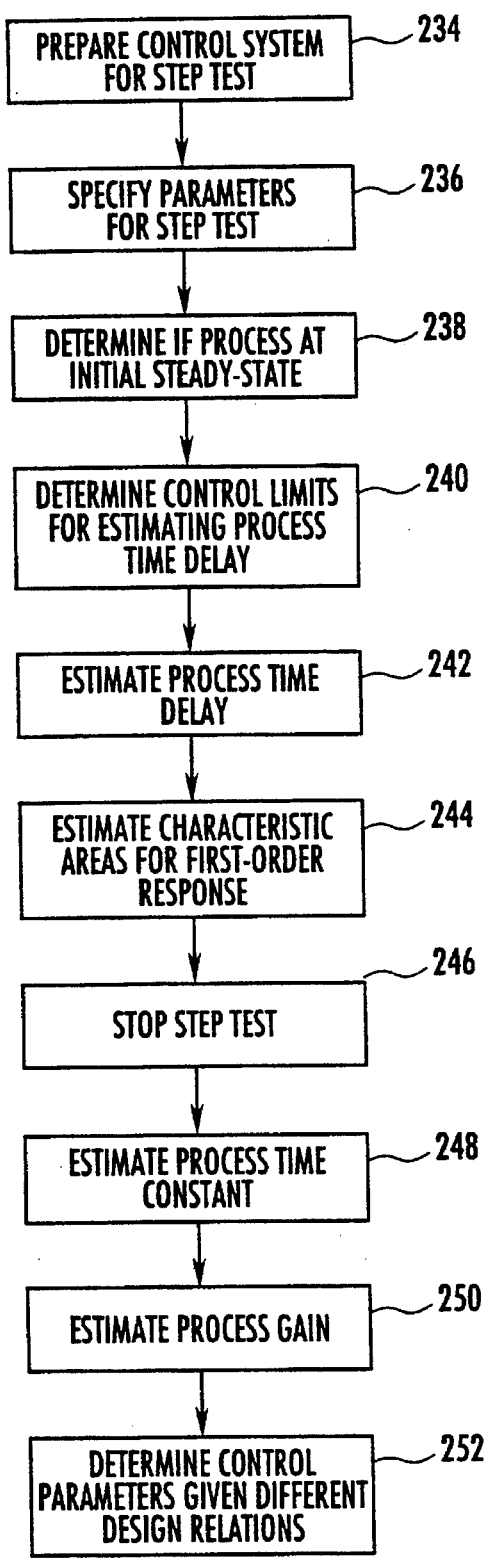
FIG. 6 is a flow diagram illustrating the manner in which the autotuning controller of FIG. 5A may be implemented for automatically adjusting control parameters in accordance with the present invention.

FIG. 6 is a flowchart illustrating the manner in which automatic tuning controller 216 may be implemented for estimating initial process parameters in accordance with a preferred embodiment of the present invention. The implementation generally comprises step 234 for preparing the control system for a step test, step 236 for specifying parameters for the step test, step 238 for determining when the process is at an initial steady-state and step 240 for determining the control limits for estimating the process time delay. The implementation further comprises step 242 for estimating the process time delay, step 244 for estimating the characteristic areas for a first-order response, step 246 for stopping the step test, step 248 for estimating a process time constant, step 250 for estimating process gain and step 252 for determining the control parameters given different design relations for feedback controllers. A more detailed description of these steps will now be given.

In step 234, all elements of the control system are verified to be working properly prior to running a step test. This includes, for example, autotuning controller 216 receiving a signal for the process output and verifying actuator 28 is operating properly. If control system 10 uses an electric to pneumatic (E-P) converter to drive actuator 28, then the zero and span of the E-P converter are adjusted so that the output range of the E-P converter matches the activation range of the actuator.

The open loop step test is run in the high gain region of the process. This ensures the control system remains is stable for other regions of operation. The process gain is equal to the ratio of the steady-state change in the process output to the change in controller output following a step change in the controller output.

Figure 7:
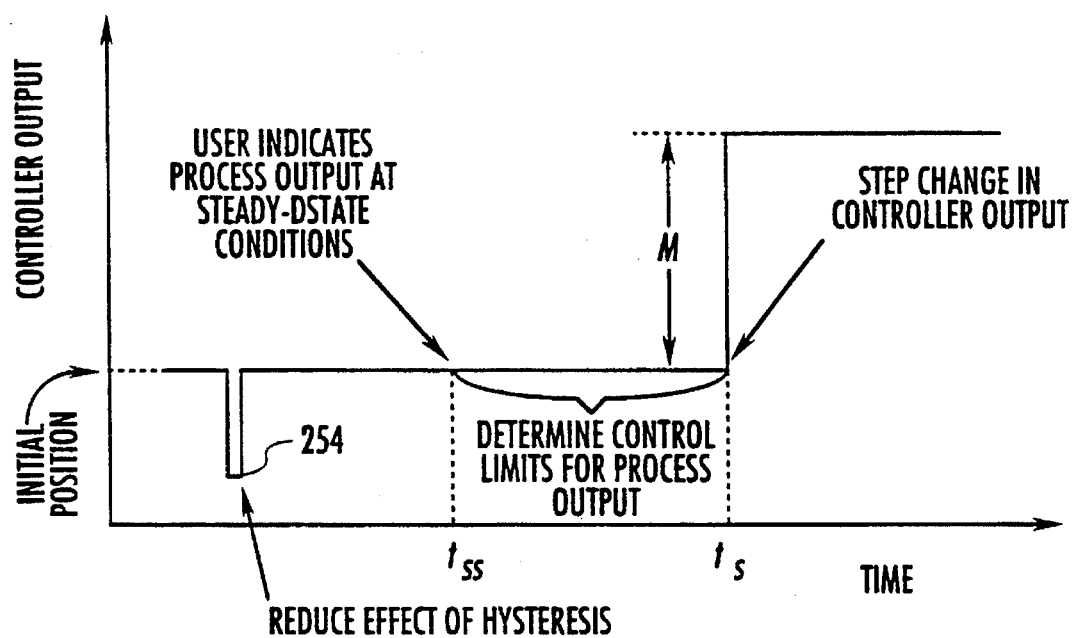
FIG. 7 is a graph of controller output during a step test.

For systems with a large amount of hysteresis in the controlled device, the controlled device is stroked to reduce the effect of hysteresis on the step test. For example, if the controlled device is an actuator like a damper, the damper is opened and closed to reduce hysteresis, as illustrated at hysteresis point 254 in FIG. 7. If the size of the step change in the controller output is positive, the controller output moves in a negative direction, then the controller output moves in the positive direction until the controller output is back to the initial position. If the size of the step change in the controller output is negative, the controller output moves in a positive direction, then the controller output moves in a negative direction until the controller output is back to the initial position.

During step 236, two parameters are specified by a user or a controller designer: 1) the size of step change in controller output (M); and 2) the resolution for sampled values of process output ($R_{sample}$). The size needed for the step change in controller output to obtain enough sampling information to accurately estimate control parameters is determined by field tests and other techniques which are well-known in the art. The resolution for the sampled value of the process output is determined from:

$$R_{sample} = \text{Maximum} \left\{ \frac{\text{SensorRange}}{2^{m-1}}, \text{Sensor Resolution} \right\} \quad (23)$$

where m=number of bits of resolution used in the analog to digital converter.

Figure 8:
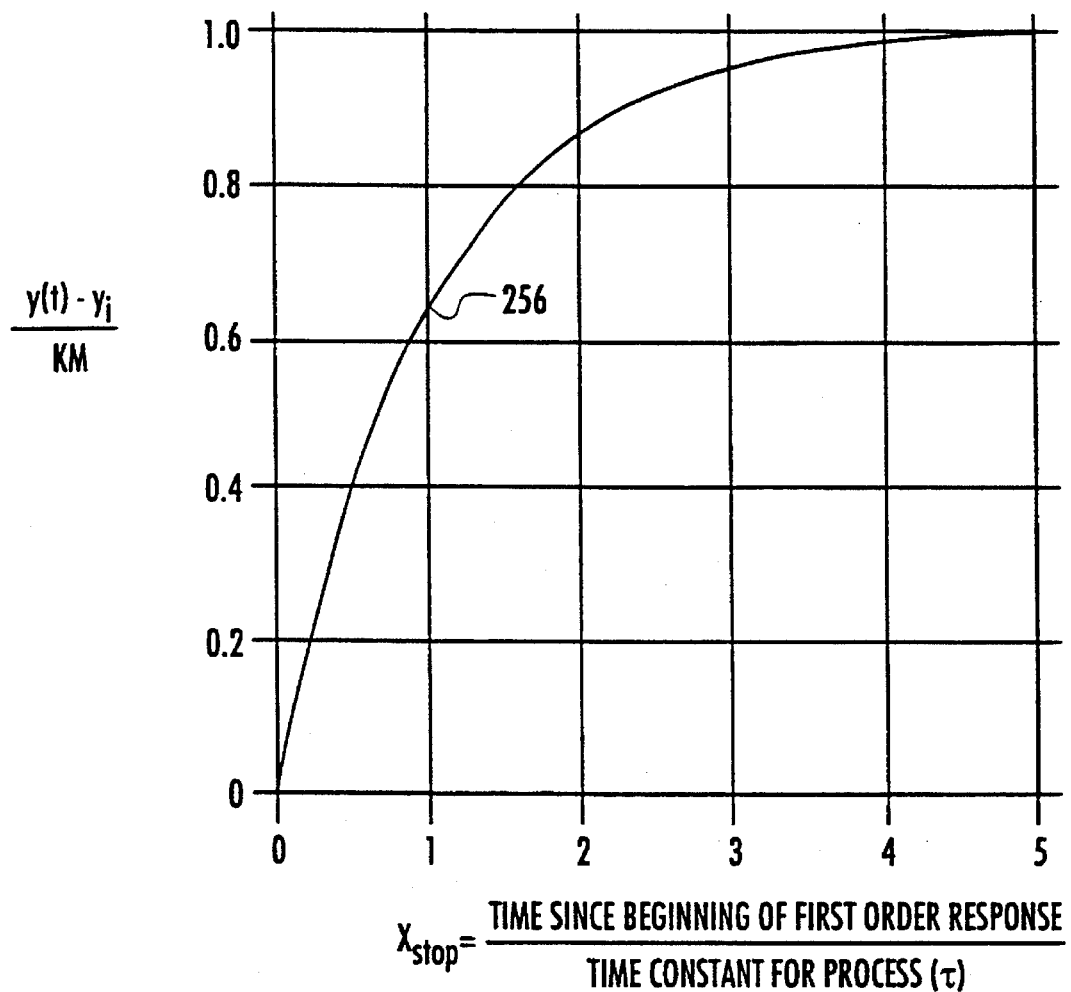
FIG. 8 is a graph of the relationship between the system response and the ratio of time since the beginning of the first order response to the time constant for the process.

If the step test is automatically stopped by autotuning controller 216, two additional parameters are specified: $\tilde{R}_{max}$ and $X_{stop}$. $\tilde{R}_{max}$ is an estimate of the maximum ratio of time constant to process time delay. For example, in the preferred embodiment of the present invention, HVAC systems are assigned a $\tilde{R}_{max}$ value of approximately one. $X_{stop}$ is the number of time constants of the first order part of response until the test is stopped. In the preferred embodiment of the present invention, a value for $X_{stop}$ is approximately 2 to 3. For systems with a large time constant, such as the response of a room, a smaller value of $X_{stop}$ is used, for example from approximately 0.5 to 1. FIG. 8 shows the relationship between $X_{stop}$ and the system response. If $X_{stop}$ is one, then the change in process output 256 is 63.2% of the final steady-state change.

Additionally, the sign of the process gain can be specified. The process gain is positive if an increase in the controller output results in an increase in the process output. Also, the process gain is positive if a decrease in the controller output results in a decrease in process output. The process gain is negative if an increase in controller output results in a decrease in the process output.

In step 238, after preparing the control system for the step test, autotuning controller 216 does not proceed to estimate parameters until the process output has reached an initial steady-state. In the present invention, for example, a systems operator observes a graph of the controller output and determines when the process reaches an initial steady-state based on the linear nature of the controller output. Alternatively, autotuning controller 216 can produce a signal indicative of an initial steady-state condition when the controller output is constrained to a general range given by predetermined upper and lower limits for a certain time interval. After autotuning controller 216 receives a signal or determines the process has reached an initial steady-state, control limits are determined in step 240 for estimating the process time delay.

Figure 9:
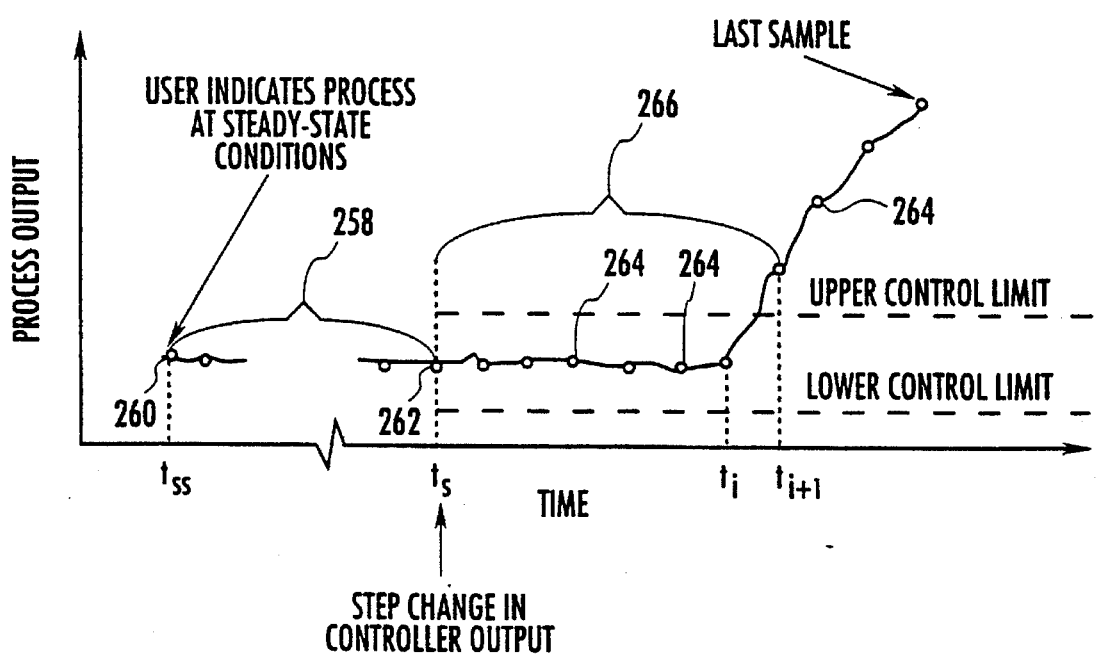
FIG. 9 is a graph of process output during a step test.

In the preferred embodiment of the present invention, a control chart is used to estimate the process time delay. FIG. 9 shows time period 258 when the control limits are determined (between time $t_{ss}$ 260 when the process is at an initial steady-state condition and time $t_s$ 262 when the controller output goes through a step change).

Specifically, control limits are determined from:

$$LCL = \bar{y} - \text{Maximum } \{3s, 3R_{sample}\} \quad (24)$$

$$UCL = \bar{y} + \text{Maximum } \{3s, 3R_{sample}\} \quad (25)$$

where:

LCL=lower control limit.

UCL=upper control limit.

$\bar{y}$=average process output during initial steady-state (i.e. between times $t_{ss}$ and $t_s$).

s=standard deviation of process output during initial steady-state.

If the sign of the process gain was specified during step 236, only one control limit is determined. A lower control limit (LCL) is determined when the product of the process gain and M is negative, and an upper control limit (UCL) is determined when the product of the process gain and M is positive, where M is the size of the step change in controller output. If the sign of the process gain was not specified during step 236, both the upper and lower control limits are determined.

The average and standard deviation of the process output during the initial steady-state are determined as follows:

$$\bar{y} = \frac{\sum_{j=1}^{N} y_j}{N} \quad (26)$$

$$s = \sqrt{\frac{\sum_{j=1}^{N} (y_j - \bar{y})^2}{N-1}} \quad (27)$$

where:

N=number of samples of process output during initial steady-state period.

In the present invention, approximately forty samples are used to determine the average and standard deviation of the process output during the initial steady-state period.

FIG. 9 shows samples of the process output 264, as indicated by the small circles, following step change 262 in controller output. In step 242, a time delay 266 is determined after, for example, four consecutive samples are greater than the upper control limit or, for example, four consecutive samples are less than the lower control limit. Estimated process time delay 266 is determined from:

$$\hat{\Theta} = t_{i+1} - t_s \quad (28)$$

A controller design is more conservative for longer estimates of time delay 266. Thus, in the preferred embodiment of the present invention, the first sample outside the control limits is used to estimate time delay 266 of the process.

If the sign of the process gain was specified during step 236, only one control limit is used to determine time delay 266. The upper control limit is used when the product of the process gain and M is greater than zero, and the lower control limit is used when the product of the process gain and M is less than zero.

Figure 10:
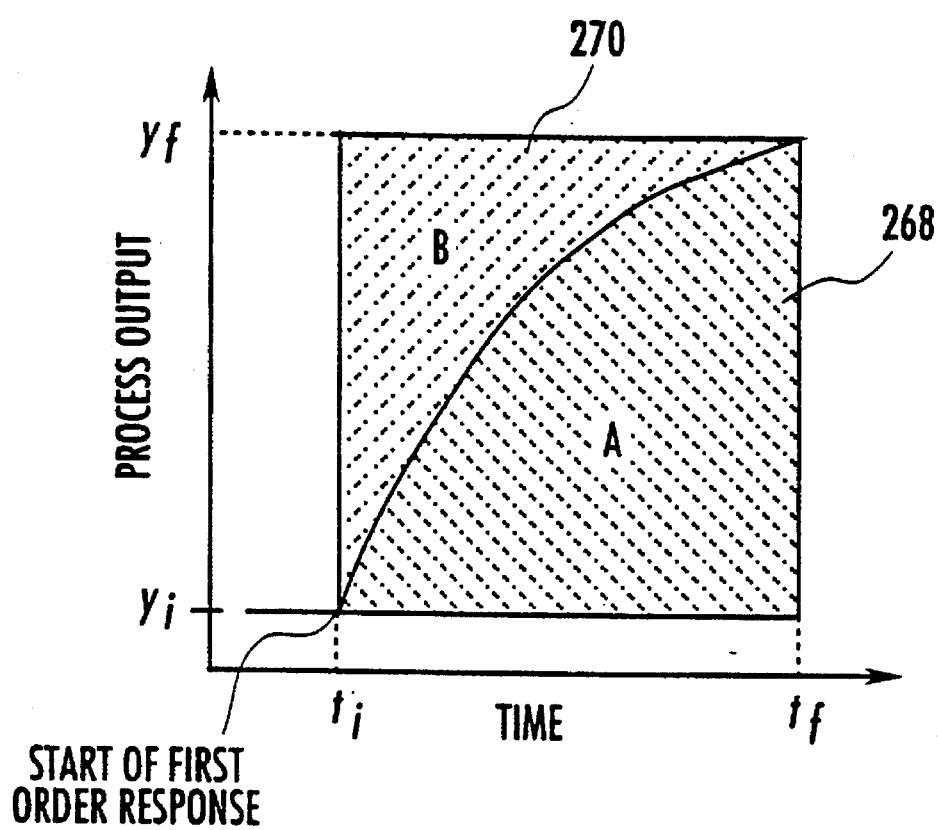
FIG. 10 is a graph of the first order part of the system response illustrated by Areas A and B.

FIG. 10 shows the first order part of the response with Areas A and B. During step 244, characteristic Area A 268 and Area B 270 for a first order response are estimated. Using Equation 22 and integrating from $t_i$ to $t_f$:

$$A = \int_{t_i}^{t_f} KM[1 - e^{-(t-t_i)/\tau}]dt = KMt + KM\tau e^{-(t-t_i)/\tau} \Big|_{t_i}^{t_f} \quad (29)$$

$$= KM(t_f - t_i) + KM\tau e^{-(t_f-t_i)/\tau} - KM\tau$$

Substituting the equation $y_f = y(t_f)$:

$$B = (t_f - t_i)[y(t_f) - y_i] - A \quad (30)$$

Substituting Equations 22 and 29 into 30:

$$B = (t_f - t_i)KM[1 - e^{-(t_f-t_i)/\tau}] - [KM(t_f-t_i) + KM\tau e^{-(t_f-t_i)/\tau} - KM\tau] = (t_i - t_f)K M e^{-(t_f-t_i)/\tau} - KM\tau e^{-(t_f-t_i)/\tau} + KM\tau \quad (31)$$

Using Equations 29 and 31, the ratio of Area A 268 to Area B 270, which is related to the time since the start of the first order response and the process time constant, is:

$$\frac{A}{B} = \frac{xe^x + 1 - e^x}{e^x - 1 - x} \quad (32)$$

where $$x = \frac{t_f - t_i}{\tau}$$

$t_f - t_i$=time since the start of the first order response.

A two step procedure is used to estimate Area A 268. A smoothed estimate of the process output is determined from a least squares polynomial approximation. The smoothed process output is then integrated using the trapezoidal rule. A smoothed estimate of the process output is determined from:

$$\tilde{y}_t = \frac{1}{70}(-6 y_{t-2} + 24y_{t-1} + 34y_t + 24y_{t+1} - 6y_{t+2}) \quad (33)$$

where $\tilde{y}_t$=estimate of process output at time t $y_{t+jT}$=sampled value of process output at time t+jT T=time step, i.e., time between samples Equation 33 is based upon minimizing the sum of square of errors to a quadratic approximation for approximately five evenly spaced points as described by Scheid, Francis, *Shaum's Outline Series—Theory and Problems of Numerical Analysis*, McGraw-Hill Book Company, New York, 1968. Smoothing the process output helps reduce the effect of noise on the estimate of Area A 268. Assuming the initial process output equals the average determined from Equation 27 (i.e., $y_i = \bar{y}$) and numerically integrating Equation 31 with the trapezoidal rule:

$$\hat{A} = T \left[ (\tilde{y}_{i+1} - \bar{y}) + (\tilde{y}_{i+2} - \bar{y}) + \ldots + (\tilde{y}_{f-2} - \bar{y}) + (\tilde{y}_{f-1} - \bar{y}) + \frac{(\tilde{y}_f - \bar{y})}{2} \right] \quad (34)$$

Assuming $Y_i = \bar{y}$, an estimate of Area B 270 is:

$$\hat{B} = (t_f - t_i)(\tilde{y}_f - \bar{y}) - \hat{A} \quad (35)$$

where $t_f$ if the final estimate of the smoothed process output.

In step 246, there are two methods for stopping the step test. The user can stop the test by sending a stop signal to autotuning controller 216 or, in the preferred embodiment of the present invention, autotuner controller 216 automatically stops the step test when the time since the beginning of the first order response is longer than $X_{stop}$ times the process time constant. $X_{stop}$ is the number of time constants that the operator wants to run the test for. In the present invention, the step test is automatically stopped when both of the following inequalities are satisfied:

$$t_f - t_i \geq X_{stop} \tilde{R}_{max} \hat{\tau}_{dead} \quad (36)$$

$$\frac{A}{B} \geq \frac{e^{X_{stop}} - 1 - X_{stop} e^{X_{stop}}}{1 - e^{X_{stop}} + X_{stop}} \quad (37)$$

where;

$$A = \int_{t_i}^{t_f} [y(t) - y_i] dt \quad (38)$$

$$B = (t_f - t_i)[y_f - y_i] - A \quad (39)$$

In order to estimate the time constant in step 248, x is determined as a function of Area A 268 and Area B 270. However, the analytical solution for writing x as a function of Area A 268 and Area B 270 is not known. An approximate solution is determined by using use linear least squares techniques to determine the coefficients in:

$$\hat{x}(R) = c_0 + c_1 R + \ldots + c_n R^n \quad (40)$$

where:

$\hat{x}(R)$=approximate value of x.

R=A/B $a_n$=coefficient determined from linear least squares.

The coefficients in Equation 40 are determined by minimizing the function:

$$\psi = \sum_{i=1}^{200} [x_i - \hat{x}(R(x_i))]^2 \quad (41)$$

where:

$x_i = 0.1i$

Therefore, an estimate of the time constant of the process is determined from:

$$\hat{\tau} = \frac{t_f - t_i}{c_0 + c_1 \left(\frac{\hat{B}}{\hat{A}}\right) + \ldots + c_n \left(\frac{\hat{B}}{\hat{A}}\right)^n} \quad (42)$$

The following Table 3 contains the $c_j$ constants for n equal to 2, 3, and 4.

TABLE 3

| | Coefficients in Equation 42 | | | | |
|---|---|---|---|---|---|
| n | $c_0$ | $c_1$ | $c_2$ | $c_3$ | $c_4$ |
| 2 | −2.22996 | 2.59052 | −0.210996 | | |
| 3 | −3.15176 | 3.89611 | −0.766473 | 0.072435 | |
| 4 | −3.90481 | 5.32937 | −1.71449 | 0.332855 | −0.0253157 |

In an alternative embodiment of the present invention, Newton's method for finding a root of an equation could be used to determine the time constant of the process from Equation 32. The estimate of the time constant of the process can be used by adaptive controllers, for example PRAC 20, to determine an appropriate sampling interval:

$$T = \hat{\tau}/10$$

where T is the sampling interval for PRAC 20.

During step 250, Equation 22 is used for determining the process gain. Using the estimates for $y_f$, $y_i$, $\Theta$ and $\tau$:

$$\hat{K} = \frac{\tilde{y}_f - \bar{y}}{M[1 - e^{-(t_f - t_s - \Theta)/\hat{\tau}}]} \quad (43)$$

where $\hat{K}$ is an estimate of the process gain.

Multidimensional minimization methods, such as the Simplex method described by Press, W. H., B. P. Flannery, S. A. Teukolsky, and W. T. Vetterling, *Numerical Recipes—The Art of Scientific Computing*, Cambridge University Press, Cambridge, 1989, are used to improve the estimates for process gain, time constant, and time delay. The estimates of the process gain, time constant, and time delay could be used as the initial values in the minimization routines.

Finally, in step 252, system control parameters are estimated given different design relations for determining parameters for continuous feedback controllers. Design relations for digital controllers are obtained by increasing the time delay by one-half the sampling period.

In the preferred embodiment of the present invention, Cohen and Coon controller design relations are used to estimate system control parameters for a proportional-gain controller (Cohen, G. H. and Coon, G. A., Theoretical Considerations of Retarded Control, *Trans. ASME* 75, 827, 1953):

$$K_c = \frac{1}{\hat{K}} \frac{\hat{\tau}}{\hat{\Theta}} [1 + (\hat{\Theta}/3\hat{\tau})] \quad (44)$$

In the present invention, Modified Integrated Time Absolute Error (ITAE) design relations are used for estimating system control parameters for PI controllers. Seborg, D. E., T. F. Edgar, and D. A. Mellichamp, *Process Dynamics and Control*, John Wiley & Sons, 1989. These design relations are based on the following equations:

$$K_c = \frac{0.586}{\hat{K}} \left( \frac{\hat{\Theta} + (T/2)}{\hat{\tau}} \right)^{-0.916} \quad (45)$$

$$\tau_I = \frac{\hat{\tau}}{1.03 - 0.165 \left[ \frac{(\hat{\Theta} + (T/2))}{\hat{\tau}} \right]} \quad (46)$$

Finally, ITAE design relations are also used for estimating system control parameters for PID controllers. These design relations are based on the following equations:

$$K_c = \frac{0.965}{\hat{K}} \left( \frac{\hat{\Theta} + (T/2)}{\hat{\tau}} \right)^{-0.85} \quad (47)$$

$$\tau_I = \frac{\hat{\tau}}{0.796 - 0.1465 \left[ \frac{(\hat{\Theta} + (T/2))}{\hat{\tau}} \right]} \quad (48)$$

$$\tau_D = 0.308 \hat{\tau} \left( \frac{\hat{\Theta} + (T/2)}{\hat{\tau}} \right)^{0.929} \quad (49)$$

where T=sampling time for A/D converter.

Equations 45 through 49 are based on minimizing the integral of the time-weighted absolute error following a set point change. Equations 45 to 49 are for control systems where the error equals the setpoint minus the process output. Some controllers define the error as the process output minus the setpoint. For these controllers, the controller gain is equal to the negative of the gain as determined from Equations 45 and 49.

In general, Equations 45–49 represent "conservative" estimates of the system control parameters. In the present invention, the estimates based on Equations 45–49 are divided in half to obtain "moderate" estimates or divided by four to obtain "aggressive" estimates of the system control parameters.

By way of modification, other design methods which are applicable to a wide range of process models can be used. For example, a direct synthesis approach provides insight about the relation between the process and the resulting controller. Ragazzini, J. R. and Franklin, G. F., *Sampled-Data Control Systems*, McGraw-Hill, New York, 1958; Smith, C. L., Corripio, A. B. and Martin, J. Jr., Controller Tuning from Simple Process Models, *Instrum. Technol.* 22 (12), 39 (1975).

An internal model control design explicitly takes into account model uncertainty and allows the designer to tradeoff control system performance against control system robustness to process changes and modeling errors. Morari, M. and Zafiriou, E., *Robust Process Control*, Prentice-Hall, Englewood Cliffs, N.J., 1989; Rivera, D. E., Morari, M. and Skogestad, S., Internal Model Control, 4. PID Controller Design, *Ind. Eng. Process Design Dev.* 25, 252 (1986). Other design methods include Dahlin's algorithm (Seborg, Dale E., Edgar, Thomas F. and Mellichamp, Duncan A., *Process Dynamics and Control*, John Wiley & Sons, New York, N.Y.) and *Lead-Lag compensation* (Houpis, Constantine H. and Lamont, Gary B., *Digital Control Systems—Theory, Hardware, Software*, McGraw-Hill, New York, 1985).

As can be seen from the foregoing, the present invention provides an automatic tuning controller which quickly estimates parameters of a first-order plus time-delay model from an open loop step test of a self-regulating system. Further, the present invention provides an automatic tuning controller which accurately estimates process parameters when a step test is stopped before the process output reaches a final steady-state. Additionally, the present invention provides an autotuning controller which accurately estimates time delay, time constant, and process gain from noisy signals. Finally, the present invention provides an automatic tuning controller with an ability to automatically stop the step test so the user does not have to monitor the entire test.

While a particular embodiment of the present invention has been shown and described, modifications may be made. It is therefore intended in the appended claims to cover all such changes and modifications which fall within the true spirit and scope of the invention.

What is claimed is:

1. A method of automatically adjusting the control parameters of a feedback controller disposed to control a process in a system, comprising the steps of:

specifying at least one parameter for a step test;

determining if the process has reached an initial steady-state;

determining at least one control limit after the system is in the initial steady-state;

estimating a process time delay value for the process, said step of estimating a process time delay value including basing the process time delay value on the at least one control limit;

estimating a plurality of characteristic areas, a process time constant and a process gain value;

stopping the step test; and determining at least one control parameter for the feedback controller.

2. The method of claim 1 further comprising the steps of:

verifying the feedback controller is properly reading a process output signal;

verifying an actuator in the system is working properly; and utilizing the at least one control parameter to adjust the position of the actuator in the system.

3. The method of claim 2 wherein the step of specifying at least one parameter for the step test further comprises:

specifying a size of step change in the controller output (M) and a sampled resolution value ($R_{sample}$), wherein the sampled resolution value is determined from the equation:

$$R_{sample} = \text{Maximum} \left\{ \frac{\text{SensorRange}}{2^{m-1}}, \text{Sensor Resolution} \right\}.$$

4. The method of claim 3 wherein the step of specifying at least one parameter for the step test further comprises:

estimating a maximum ratio of the process time constant to the process time delay value; and specifying a stop value based on the number of time constants until the step test is stopped.

5. The method of claim 4 wherein the step of specifying at least one parameter for the step test further comprises specifying a sign of the process gain value.

6. The method of claim 1 wherein an upper control limit and a lower control limit are determined from the equations:

$$LCL = \bar{y} - \text{Maximum} \{3s, 3R_{sample}\}$$

$$UCL = \bar{y} + \text{Maximum} \{3s, 3R_{sample}\}.$$

7. The method of claim 1 wherein the process time delay value for the process is determined according to the equation:

$$\hat{\Theta} = t_{i+1} - t_s.$$

8. The method of claim 1 wherein the plurality of characteristic areas are determined according to the equations:

$$\hat{A} = T\left[ (\tilde{y}_{i+1} - \bar{y}) + (\tilde{y}_{i+2} - \bar{y}) + \ldots + (\tilde{y}_{f-2} - \bar{y}) + (\tilde{y}_{f-1} - \bar{y}) + \frac{(\tilde{y}_f - \bar{y})}{2} \right]$$

$$\hat{B} = (t_f - t_i)(\tilde{y}_f - \bar{y}) - \hat{A}.$$

9. The method of claim 1 wherein the process time constant is determined according to the equation:

$$\hat{\tau} = \frac{t_f - t_i}{c_0 + c_1\left(\frac{\hat{B}}{\hat{A}}\right) + \ldots + c_n\left(\frac{\hat{B}}{\hat{A}}\right)^n}.$$

10. The method of claim 1 wherein the process gain value is determined according to the equation:

$$\hat{K} = \frac{\tilde{y}_f - \bar{y}}{M[1 - e^{-(t_f - t_i - \hat{\theta})/\hat{\tau}}]}.$$

11. The method of claim 1 wherein the feedback controller is a proportional gain (P) controller.

12. The method of claim 11 wherein the at least one control parameter for the feedback controller is determined according to the equation:

$$K_c = \frac{1}{\hat{K}} \frac{\hat{\tau}}{\theta} [1 + (\theta/3\hat{\tau})].$$

13. The method of claim 1 wherein the feedback controller is a proportional gain, integral time (PI) controller.

14. The method of claim 13 wherein the at least one control parameter for the feedback controller is determined according to the equations:

$$K_c = \frac{0.586}{\hat{K}} \left( \frac{\hat{\theta} + (T/2)}{\hat{\tau}} \right)^{-0.916}$$

$$\tau_I = \frac{\hat{\tau}}{1.03 - 1.65\left[\frac{(\hat{\theta} + (T/2))}{\hat{\tau}}\right]}.$$

15. The method of claim 1 wherein the feedback controller is a proportional gain, integral time, derivative time (PID) controller.

16. The method of claim 15 wherein the at least one control parameter for the feedback controller is determined according to the equations:

$$K_c = \frac{0.965}{\hat{K}} \left( \frac{\hat{\theta} + (T/2)}{\hat{\tau}} \right)^{-0.85}$$

$$\tau_I = \frac{\hat{\tau}}{0.796 - 0.1454\left[\frac{(\hat{\theta} + (T/2))}{\hat{\tau}}\right]}$$

$$\tau_D = 0.308\hat{\tau}\left( \frac{\hat{\theta} + (T/2)}{\hat{\tau}} \right)^{0.929}.$$

17. The method of claim 1 wherein the system is an HVAC system.

18. The method of claim 1 wherein the step test is automatically stopped when the following inequalities are satisfied:

$$t_f - t_i \geq X_{stop} \bar{R}_{max} \hat{\tau}_{dead}$$

$$\frac{A}{B} \geq \frac{e^{X_{stop}} - 1 - X_{stop} e^{X_{stop}}}{1 - e^{X_{stop}} + X_{stop}}$$

where:

$$A = \int_{t_i}^{t_f} [y(t) - y_i] dt$$

$$B = (t_f - t_i)[y_f - y_i] - A.$$

19. A feedback controller disposed to control a process in a system, said apparatus comprising:
   means for specifying at least one parameter for a step test;
   means for determining if the process is in an initial steady-state;
   means for determining at least one control limit after the system is in the initial steady-state;
   means for estimating a process time delay value for the process, said means for estimating a process time delay value including basing the time delay value on the at least one control limit;
   means for estimating a plurality of characteristic areas, a process time constant and a process gain value;
   means for stopping the step test; and
   means for determining at least one control parameter for the feedback controller.

20. The apparatus of claim 19 further comprising:
   means for verifying the feedback controller is properly reading a process output signal;
   means for verifying an actuator in the system is working properly; and
   means for utilizing the at least one control parameter to adjust the position of the actuator in the system.

21. The apparatus of claim 20 wherein the means for specifying at least one parameter for the step test further comprises:
   means for specifying a size of step change in the controller output (M) and a sampled resolution value ($R_{sample}$), wherein the sampled resolution value is determined from the equation:

$$R_{sample} = Maximum \left\{ \frac{SensorRange}{2^{m-1}}, \text{Sensor Resolution} \right\}.$$

22. The apparatus of claim 21 wherein the means for specifying at least one parameter for the step test further comprises:
   means for estimating a maximum ratio of the process time constant to the process time delay value; and
   means for specifying a stop value based on the number of time constants until the step test is stopped.

23. The apparatus of claim 22 wherein the means for specifying at least one parameter for the step test further comprises means for specifying a sign of the process gain value.

24. The apparatus of claim 19 wherein an upper control limit and a lower control limit are determined from the equations:

$$LCL = \bar{y} - Maximum \{3s, 3R_{sample}\}$$

$$UCL = \bar{y} + Maximum \{3s, 3R_{sample}\}.$$

25. The apparatus of claim 19 wherein the process time delay value for the process is determined according to the equation:

$\hat{\theta} = t_{i+1} - t_s.$

26. The apparatus of claim 19 wherein the plurality of characteristic areas are determined according to the equations:

$$\hat{A} = T \left[ (\tilde{y}_{i+1} - \bar{y}) + (\tilde{y}_{i+2} - \bar{y}) + \ldots + (\tilde{y}_{f-2} - \bar{y}) + (\tilde{y}_{f-1} - \bar{y}) + \frac{(\tilde{y}_f - \bar{y})}{2} \right]$$

$$\hat{B} = (t_f - t_i)(\tilde{y}_f - \bar{y}) - \hat{A}.$$

27. The apparatus of claim 19 wherein the process time constant is determined according to the equation:

$$\hat{\tau} = \frac{t_f - t_i}{c_0 + c_1 \left(\frac{\hat{B}}{\hat{A}}\right) + \ldots + c_n \left(\frac{\hat{B}}{\hat{A}}\right)^n}.$$

28. The apparatus of claim 19 wherein the process gain value is determined according to the equation:

$$\hat{K} = \frac{\tilde{y}_f - \bar{y}}{M[1 - e^{-(t_f - t_s - \hat{\theta})/\hat{\tau}}]}.$$

29. The apparatus of claim 19 wherein the feedback controller is a proportional gain (P) controller.

30. The apparatus of claim 29 wherein the at least one control parameter for the feedback controller is determined according to the equation:

$$K_c = \frac{1}{\hat{K}} \frac{\hat{\tau}}{\hat{\theta}} [1 + (\hat{\theta}/3\hat{\tau})].$$

31. The apparatus of claim 19 wherein the feedback controller is a proportional gain, integral time (PI) controller.

32. The apparatus of claim 31 wherein the at least one control parameter for the feedback controller is determined according to the equations:

$$K_c = \frac{0.586}{\hat{K}} \left( \frac{\hat{\theta} + (T/2)}{\hat{\tau}} \right)^{-0.916}$$

$$\tau_I = \frac{\hat{\tau}}{1.03 - 0.165 \left[ \frac{(\hat{\theta} + (T/2))}{\hat{\tau}} \right]}.$$

33. The apparatus of claim 19 wherein the feedback controller is a proportional gain, integral time, derivative time (PID) controller.

34. The apparatus of claim 33 wherein the at least one control parameter for the feedback controller is determined according to the equations:

$$K_c = \frac{0.965}{\hat{K}} \left( \frac{\hat{\theta} + (T/2)}{\hat{\tau}} \right)^{-0.85}$$

$$\tau_I = \frac{\hat{\tau}}{0.796 - 0.1465 \left[ \frac{(\hat{\theta} + (T/2))}{\hat{\tau}} \right]}$$

$$\tau_D = 0.308 \hat{\tau} \left( \frac{\hat{\theta} + (T/2)}{\hat{\tau}} \right)^{0.929}.$$

35. The apparatus of claim 19 wherein the system is an HVAC system.

36. The apparatus of claim 19 wherein the step test is automatically stopped when the following two inequalities are satisfied:

$$t_f - t_i \geq X_{stop} \tilde{R}_{Max} \hat{\tau}_{dead}$$

$$\frac{A}{B} \geq \frac{e^{X_{stop}} - 1 - X_{stop} e^{X_{stop}}}{1 - e^{X_{stop}} + X_{stop}}$$

where:

$A = \int_{t_i}^{t_f} [y(t) - y_i] dt$ $B = (t_f - t_i)[y_f - y_i] - A.$

* * * * *

UNITED STATES PATENT AND TRADEMARK OFFICE
CERTIFICATE OF CORRECTION

PATENT NO. : 5,568,377
DATED : October 22, 1996
INVENTOR(S) : John E. Seem et al.

It is certified that error appears in the above-indentified patent and that said Letters Patent is hereby corrected as shown below:

Column 23, line 8, claim 8

" $-\bar{A}$ " should be -- $-\hat{A}$ --.

Column 23, line 30, claim 12

" $(\theta/3\hat{\tau})$ " should be -- $(\hat{\theta}/3\hat{\tau})$ --.

Column 23, line 44, claim 14
"1.65" should be --0.165--.

Column 23, line 57, claim 16
"0.1454" should be --0.1465--.

Column 25, line 35, claim 30

" $(\theta/3\hat{\tau})]$ " should be -- $(\hat{\theta}/3\hat{\tau})]$    (44)--.

Signed and Sealed this

Sixteenth Day of September, 1997

Attest:

BRUCE LEHMAN

*Attesting Officer*    *Commissioner of Patents and Trademarks*